Patented July 25, 1944

2,354,393

UNITED STATES PATENT OFFICE 2,354,393

PROCESS FOR EXTRACTING PROLAMINES

Ralph H. Manley and Cyril D. Evans, Peoria, Ill., assignors to Claude R. Wickard, as Secretary of Agriculture of the United States of America, and to his successors in office No Drawing. Application February 4, 1942, Serial No. 429,577

4 Claims. (Cl. 260—123)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a new and useful method of extracting prolamines from vegetable material and more particularly to the extraction of zein from corn gluten and gliadin from wheat gluten.

The present commercial method of obtaining prolamines from vegetable material comprises the extraction of the vegetable material with aqueous solutions of ethyl or isopropyl alcohol for 1 to 2½ hours at 50 to 60° C. After clarification and concentration of the aqueous-alcohol extract, the prolamine is precipitated by dilution with water, filtered, and dried to a powder. This procedure has several disadvantages, among which are the following:

1. High solvent loss during a long extraction period.
2. Difficulty in recovering the alcohol from the very dilute solution arising from dilution of the system with water.
3. Danger of gelation of the prolamine.

Gelation of the prolamine during and subsequent to extraction is a particularly serious difficulty inherent to the present extraction process. Since the rate of gelation of zein dispersions in aqueous 85 percent ethyl or isopropyl alcohol increases very rapidly with rise in temperature, and since such dispersions may set to a gel in a few minutes at temperatures approaching the boiling points of the solvents, great care must be exercised to keep the temperature of the extraction mixture as low as possible. However, this has its limitations as the time required for extraction must be greatly extended as the temperature of the extraction mixture is lowered.

The tendency of aqueous-alcoholic dispersions of the prolamines to set to a useless gel makes it necessary in the present process to precipitate the protein from the solution as promptly as possible, and to convert to a dry solid for storage purposes.

In the preparation of aqueous-alcoholic dispersions of the prolamines for use as spirit varnishes, it is desirable according to present practice to redisperse the dried protein in the aqueous alcohol at the time the varnish is to be used. Otherwise, gelation may take place with consequent loss of protein and solvent.

We have found that prolamines such as zein and gliadin may be extracted from suitable vegetable material such as corn gluten, rye gluten or wheat gluten in high yields and without danger of gelation by heating, the prolamine containing material with a prolamine dispersing medium, such as an alcohol or other suitable organic compounds in the presence of an aldehyde.

We have found that extraction of prolamines by the use of prolamine dispersing media in the presence of an aldehyde eliminates all danger of gelation during extraction and subsequent processing, and yields a prolamine dispersion which does not gel upon prolonged storage. By virtue of this stability the prolamine preparations obtained by our method may be clarified and concentrated in the liquid phase, and are immediately suitable either for storage or for use in commercial processing without further treatment.

Furthermore, by carrying out our process under certain conditions, for example at elevated temperatures in closed containers, it is possible to minimize solvent losses and reduce the extraction period necessary to obtain high yields of extracted prolamines.

We have found a number of organic prolamine dispersing media to be suitable for use as constituents of our extraction mixtures. We may use aliphatic alcohols such as methyl, ethyl, and the propyl alcohols, aliphatic ketones such as acetone, certain organic oxides as dioxane, lower glycols as ethylene glycol, and the lower glycol esters as methyl and ethyl cellosolve and Carbitol. Also, certain aromatic organic hydroxy compounds such as phenol and resorcinol may be used as constituents of the extraction mixtures in our process. However, because of their low cost, suitable volatility, the low viscosity of the prolamine dispersions formed and their low toxicity we prefer to use either ethyl or isopropyl alcohol.

We have also found that a wide variety of aldehydes may be used in carrying out the process of our invention. It is desirable that the aldehyde used be miscible with the other components of the extraction medium. If this requirement is met any aliphatic, aromatic or heterocyclic aldehyde may be used, such as, for instance, formaldehyde, acetaldehyde, propionaldehyde, butyraldehydes, crotonaldehyde, acrolein, chloral, benzaldehyde, furfuraldehyde.

Instead of an aldehyde we may also use substances yielding aldehydes, in the course of the extraction process, either through molecular rearrangement or decomposition. For example hexamethylenetetramine, paraldehyde, glyoxal, dioxane, tetrahydrodioxane or acetonyl acetone are suitable aldehyde yielding substances and may be used in our extraction process, provided that the extraction mixture is heated for a sufficient time at the necessary elevated temperature. However, because of their low cost and because of the particularly desirable properties which they impart to the extracted protein, we prefer to use formaldehyde, acetaldehyde, butyraldehyde, or furfuraldehyde.

The successful operation of our invention is dependent upon extraction of the vegetable material with the selected solvent mixture at an elevated temperature as hereafter defined, or by heating the extracted prolamine in the presence of our extraction mixtures to such elevated temperatures after extraction. By "elevated temperature" we mean temperatures sufficiently high so that the stabilizing reaction between the prolamine and the aldehyde takes place before the protein has had time to set to a gel. We have found that the use of temperatures substantially above room temperature has the further advantage of hastening the extraction. Hence to reduce the extraction cycle and minimize losses of materials by evaporation we prefer to conduct the extraction at temperatures above those at which the extraction mixture would normally boil at atmospheric pressure, by carrying out the extraction process in sealed containers such as autoclaves. However, our invention is not limited to such a method of operation. Extraction of prolamines may also be effected according to the process of our invention, by heating the prolamine containing material with a dispersing medium in the presence of an aldehyde, to temperatures lower than the boiling point of the mixture and under atmospheric presure. Under such conditions, however, extraction takes place less rapidly and it is necessary to carry out the process over longer periods of time. For example we have found that extraction of zein from corn gluten by heating the gluten with a mixture of aqueous 85 percent isopropyl alcohol containing 5 percent by volume of acetaldehyde, to 65° C. for 15 minutes is unsatisfactory both in respect to yield of extracted zein and in resistance of the extracted zein dispersion to gelatin, and that prolonged heating is necessary to achieve satisfactory results. If however the foregoing extraction is conduced at 120° C. by heating the mixture in an autoclave, satisfactory extraction both in respect to yield of extracted zein and in resistance of the extracted material to gelation is attained after a heating period of 15 minutes.

Protein films produced from prolamines which have been subjected to our process are superior in smoothness, lightness of color, flexibility, and in water resistance to protein films produced from prolamines obtained by simple extraction with aqueous alcohol.

As illustrative embodiments of a manner in which our invention may be carried out in practice the following examples are given, wherein all parts are by weight. Also, unless otherwise stated, the mesh sizes of the crude gluten used in these examples were as follows: 24% retained on a 20 mesh screen, 34% retained on a 32 mesh screen, 30% retained on a 48 mesh screen, 6.5% retained on a 60 mesh screen, 2.7% retained on an 80 mesh screen, 2% retained on a 100 mesh screen, and 0.8% finer than 100 mesh.

*Example I*

A mixture of 300 parts of crude corn gluten, 760 parts of aqueous 80% ethyl alcohol and 49 parts of 37% formaldehyde solution were placed in a sealed container and heated with agitation at 120° C. for 15 minutes, after which the mixture was cooled and filtered through diatomaceous earth. The filtrate contained 13.5 parts of zein in 100 parts of solvent, and was found to produce clear, smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol was found to be stable toward gelation for a long period at room temperature. Analysis of this concentrate showed it to contain 20 parts of zein in 100 parts of solvent.

The dried gluten contained 7.56% nitrogen before extraction, and 4.53% nitrogen after extraction, thus indicating that our extraction process had removed approximately 56% of the total protein from the crude gluten.

*Example II*

A mixture of 300 parts of crude corn gluten, 814 parts of aqueous 55% ethyl alcohol and 49 parts of 37% formaldehyde solution were placed in a sealed container and heated with agitation at 120° C. for 15 minutes, after which the mixture was cooled and filtered through diatomaceous earth. The filtrate contained 13.2 parts of zein in 100 parts of solvent, and was found to produce clear smooth, water-resistant films when applied to paper, glass, and other surfaces. The filtrate was also found to resist gelation for many months when stored at room temperature.

A portion of the filtrate was thoroughly mixed with an equal volume of isopropyl ether to remove part of the coloring matter from the dispersion and to concentrate the protein into a heavy liquid phase, which, when redispersed in a small amount of strong alcohol was found to be stable toward gelation for a long period at room temperature. Analysis of this concentrate showed it to contain 23 parts of zein in 100 parts of solvent.

The dried gluten contained 7.56% nitrogen before extraction, and 4.58% nitrogen after extraction, thus indicating that our extraction process had removed approximately 55% of the total protein from the crude gluten.

*Example III*

A mixture of 300 parts of crude corn gluten, 753 parts of aqueous 80% isopropyl alcohol and 49 parts of 40% formaldehyde were placed in a sealed container and heated with agitation at 120° C. for 15 minutes, after which the mixture was cooled and filtered through diatomaceous earth. The filtrate contained 12.8 parts of zein in 100 parts of solvent, and was found to produce clear, smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol was found to be stable toward gelation for a long period at room temperature. Analysis of this concentrate showed it to contain 23.3 parts of zein in 100 parts of solvent.

The dried gluten contained 7.56% nitrogen before extraction, and 5.66% nitrogen after extraction, thus indicating that our extraction process had removed approximately 39% of the total protein from the crude gluten.

Example IV

A mixture of 300 parts of crude corn gluten, 807 parts of aqueous 55% isopropyl alcohol and 49 parts of 37% formaldehyde solution was placed in a sealed container and heated with agitation at 120° C. for 15 minutes, after which the mixture was cooled and filtered through diatomaceous earth. The filtrate contained 13.2 parts of zein in 100 parts of solvent, and was found to produce clear smooth, water-resistant films when applied to paper, glass, and other surfaces. The filtrate was also found to resist gelation for many months when stored at room temperature.

The dried gluten contained 7.56% nitrogen before extraction, and 4.65% nitrogen after extraction, thus indicating that our extraction process had removed approximately 54% of the total protein from the crude gluten.

Example V

A mixture of 300 parts of crude corn gluten, 753 parts of aqueous 80% isopropyl alcohol and 49 parts of 37% formaldehyde solution was placed in a sealed container and heated with agitation at 120° C. for 30 minutes, after which the mixture was cooled and filtered through diatomaceous earth. The filtrate contained 13.5 parts of zein in 100 parts of solvent, and was found to produce clear smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol, was found to be stable toward gelation for a long period at room temperature. Analysis of this concentrate showed it to contain 27.8 parts of zein in 100 parts of solvent.

The dried gluten contained 7.56% nitrogen before extraction, and 5.20% nitrogen after extraction, thus indicating that our extraction process had removed approximately 46% of the total protein from the crude gluten.

Example VI

A mixture of 300 parts of crude corn gluten, 753 parts of aqueous 80% isopropyl alcohol and 27 parts of acetaldehyde were placed in a sealed container and heated with agitation at 120° C. for 15 minutes, after which the mixture was cooled and filtered through diatomaceous earth. The filtrate contained 14.2 parts of zein in 100 parts of solvent, and was found to produce clear, smooth, water-resistant films when applied to paper, glass, and other surfaces. The filtrate was also found to resist gelation for many months when stored at room temperature.

The dried gluten contained 7.56% nitrogen before extraction, and 4.91% nitrogen after extraction, thus indicating that our extraction process had removed approximately 50% of the total protein from the crude gluten.

Example VII

A mixture of 300 parts of finely ground crude corn gluten, 32 to 48 mesh, 753 parts of aqueous 80% isopropyl alcohol and 49 parts of 37% formaldehyde solution was placed in a sealed container and heated with agitation at 120° C. for 15 minutes, after which the mixture was cooled and filtered through diatomaceous earth. The filtrate contained 15.6 parts of zein in 100 parts of solvent, and was found to produce clear, smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol, was found to be stable toward gelation for a long period at room temperature. Analysis of this concentrate showed it to contain 26.8 parts of zein in 100 parts of solvent.

The dried gluten contained 7.84% nitrogen before extraction, and 5.04% nitrogen after extraction, thus indicating that our extraction process had removed approximately 52% of the total protein from the crude gluten.

Example VIII

A mixture of 300 parts of crude corn gluten, 836 parts of aqueous 80% isopropyl alcohol and 50 parts of butyraldehyde were placed in a sealed container and heated with agitation at 120° C. for 15 minutes, after which the mixture was cooled and filtered through diatomaceous earth on a plate press. The filtrate contained 11.7 parts of zein in 100 parts of solvent, and was found to produce clear, smooth, water-resistant films when applied to paper, glass, and other surfaces. The filtrate was also found to resist gelation for many months when stored at room temperature.

A portion of the filtrate was thoroughly mixed with an equal volume of hexane to remove part of the coloring matter from the dispersion and to concentrate the protein into a heavy liquid phase, which, when redispersed by the addition of a small amount of strong alcohol, was found to be stable toward gelation for a long period at room temperature. Analysis of this concentrate showed it to contain 23.2 parts of zein in 100 parts of solvent.

The dried gluten contained 7.56% nitrogen before extraction, and 5.45% nitrogen after extraction, thus indicating that our extraction process had removed approximately 42% of the total protein from the crude gluten.

In the foregoing examples the process of our invention is illustrated as applied to the extraction of zein from corn gluten. As previously stated similar results are obtained by analogous procedures wherein other dispersing media and different aldehydes are used, and by applying our process to the extraction of other prolamines such as gliadin from wheat- or rye-gluten.

We claim:
1. The process of extracting zein from corn gluten which comprises forming a mixture of corn gluten, aqueous isopropyl alcohol, and formaldehyde and heating said mixture in a sealed contained to a temperature of about 120° C.

2. The process of extracting zein from corn gluten which comprises forming a mixture of corn gluten, aqueous isopropyl alcohol and acetaldehyde and heating said mixture in a sealed container to a temperature of about 120° C.

3. The process of extracting prolamines in a form that will resist gelation on prolonged standing comprising mixing together grain gluten, a prolamine dispersing agent, and an aldehyde, agitating and heating the mixture at a temperature of about 120° C. for about 15 to 30 minutes, whereby the reaction between the prolamine and the aldehyde is stabilized before the protein has time to gel, thence filtering the reaction mixture and recovering the prolamine containing filtrate.

4. The process of extracting prolamines in a form that will resist gelation on prolonged standing comprising mixing together a prolamine-containing material, a prolamine dispersing agent, and an aldehyde, agitating and heating the mixture at a temperature of about 120° C. for about 15 to 30 minutes, whereby the reaction between the prolamine and the aldehyde is stabilized before the protein has time to gel, thence filtering the reaction mixture and recovering the filtrate.

RALPH H. MANLEY.
CYRIL D. EVANS.